United States Patent Office 3,284,777
Patented Nov. 8, 1966

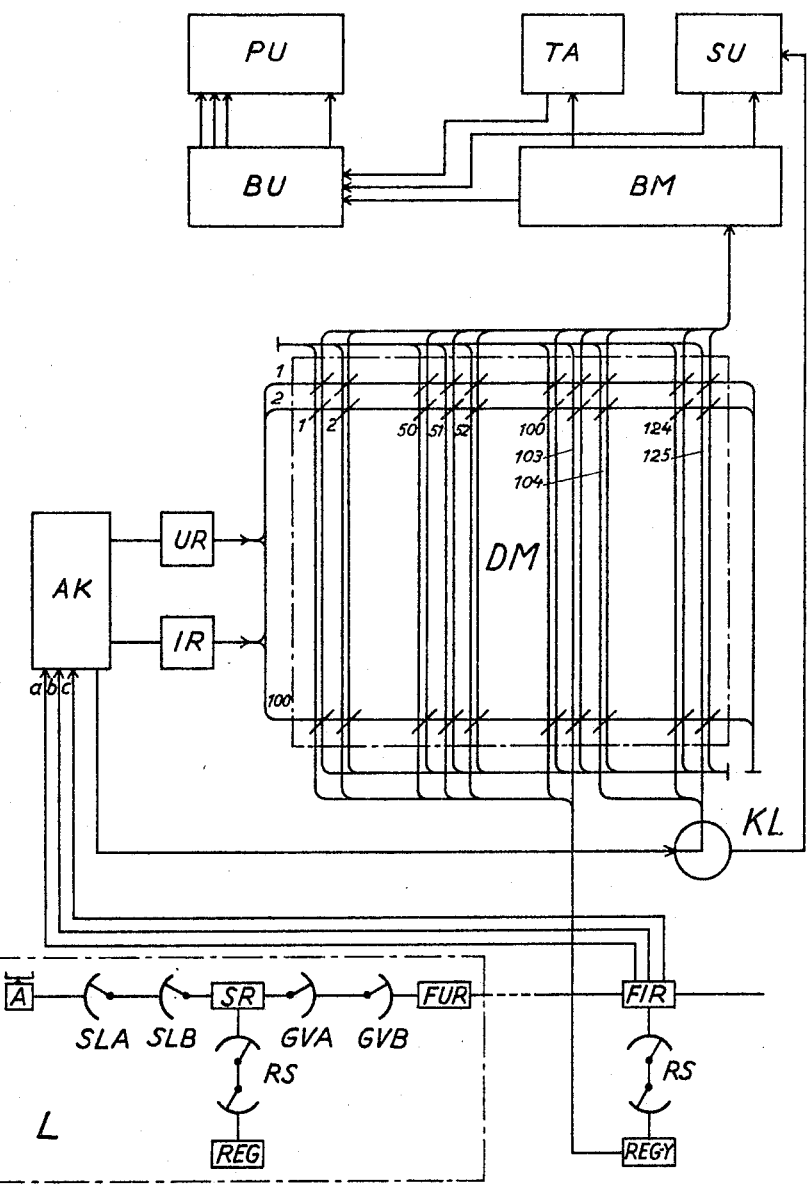

3,284,777
MESSAGE ACCOUNTING DEVICE
Per A. Carlstrom, Hagersten, and Karl G. G. V. Redelius, Sollentuna, Sweden, assignors to Telefonaktiebolaget L M Ericsson, Stockholm, Sweden, a corporation of Sweden
Filed Nov. 13, 1962, Ser. No. 237,145
Claims priority, application Sweden, Nov. 16, 1961, 11,393/61
1 Claim. (Cl. 340—172.5)

The present invention refers to a message accounting device for automatic telephone exchanges. In previously known message accounting devices the charging information (the number of the calling subscriber, the number of the called subscriber, the time of the beginning of the conversation, the time of the end of the conversation, the tariff and so on) recorded upon setting up and disconnecting a connection respectively, is stored on a common recording medium, for example a perforated tape, magnetic tape and the like and is sorted and treated after a definite time period, for example one week. The drawback with said method is that the treating is complicated and necessitates an expensive equipment, furthermore there are no direct records, so that it is very difficult to find an error and to carry out a control in the case of a complaint.

The purpose of the present invention is to bring about a message accounting device, by means of which a charging ticket, comprising the number of the calling subscriber and the necessary further information can be written for each conversation immediately at the end of the conversation, so that a long storing of nontreated information and the work of sorting the information respectively is eliminated.

The device according to the invention is substantially characterized by the fact that it comprises an accounting memory in which to each outgoing connecting relay set corresponds a group of memory elements which can have 1 and 0 condition respectively in order to store information concerning the number of the calling and the called subscriber and concerning the time of the beginning of the conversation, selecting circuits which identify a connecting relay set and connect it to the accounting memory once when the numbers of the calling and the called subscriber have been registered in a register known per se, in order to allow transmission of these numbers from the register to the accounting memory, once when the called subscriber has answered, for recording the time of beginning of the conversation in the accounting memory by means of a clock device, and once when the calling subscriber has replaced the receiver in order to transmit the records from the accounting memory to a write out device together with time information obtained by means of the clock device at the end of the conversation.

The invention will be explained more in detail by means of an embodiment with reference to the enclosed drawing in which the most important details of the accounting device are diagrammatically shown.

By A is symbolized a subscriber which through a subscriber's stage SLA, SLB, a group selector stage GVA, GVB, an outgoing connecting relay set FUR and a trunk line can be connected to an incoming connecting relay set FIR in a trunk exchange. The conversations set up through FIR have been charged by means of the charging arrangement according to the invention. The connecting relay set FIR is of known type, for example as described in Bell Lab. Rec., 1958, pages 372–375 and titled "Incoming Trunk." Local calls within the local exchange L are charged in usual manner by means of call meters without using the accounting device. By REG is denoted the register which stores the digit signals for setting up the connection and by REG–Y a register which is connected to FIR and which on one hand stores the number of the called subscriber which number before has been stored in REG and on the other hand stores the number of the calling subscriber. A corresponding register is described in Bell Laboratory Record, 1959, page 346 and titled "Sender."

According to the principle of the invention an accounting memory DM is arranged, in which records concerning each of the calls can be written, kept there during the conversation and forwarded therefrom after the end of the conversation. In the accounting memory there are a number of memory elements, for example magnetic cores which can have 1 condition and 0 condition in order to indicate digit values, a definite group of magnetic cores belonging to each FIR. According to the embodiment there are 100 rows of magnetic cores corresponding to 100 relay sets FIR. Each row of cores includes cores for recording the number of the calling subscriber, altogether 50 cores for 10 digits in 2 of 5 code, similarly 50 cores for recording the number of the called subscriber, 3 memory cores for a possible category marking (for example testing calls) and 22 cores for the recording of the time when the called subscriber has answered, altogether 125 cores. The memory thus comprises 100 times 125 cores as shown diagrammatically in the drawing by only a few rows and by only a few cores in every row. Through each of the cores extend a horizontal wire used for writing as well as for reading, a vertical wire for writing and a vertical wire for reading. Writing in each of the cores, i.e., switching of the core from 0 condition to 1 condition, can only be carried out if both the horizontal and the vertical wire obtains a current. The value of the current is substantially the half of the value necessary for writing, so that two such half-currents have to be summed. If there is no magnetizing current in the vertical wire, the cores will not be switched if to the row belonging to the respective FIR a half-current is supplied. Upon reading a current is supplied to the horizontal wire which current is opposite to the writing current and has such a value relatively to the latter, for example is double as great, that it alone causes switching of the cores and consequently a current through the vertical reading wire belonging to the respective core. Such magnetic memories are generally known (see for example Proceedings of the IRE, 1953, pages 1407–1421).

The accounting device includes a calling chain or selecting chain AK consisting of for example relays. The purpose of the selecting chain is to control the operation between connecting relay sets FIR and the accounting memory DM in such a manner that only one connecting relay set is connected to the accounting memory at the same time. The connection is carried out in definite phases of the function of the connecting relay sets in which phases writing in and reading out respectively is carried out in the row of cores belonging to the respective connecting relay set. According to the principle of the invention a connection is set up between the connecting relay set FIR and the accounting memory DM three times during each conversation due to the fact that FIR through the selecting chain AK is connected to the respective row in the memory: (a) when the numbers of the calling and the called subscriber are at disposal from REG–Y, in order to write in the number of the subscriber, (b) when the called subscriber has answered, in order to write in the time of the beginning of the conversation and (c) when the calling subscriber has replaced the receiver, in order to read out the information recorded in the respective row. By IT is indicated a writing relay set, for example of the type which is described in IRE, 1953, pages 1407–

1421 and which upon a call from a relay set FIR on (a) and (b) of the above mentioned three identifying occasions supplies a half magnetizing current to the row of cores corresponding to the respective FIR.

By UR is designated a writing relay set which is of similar type as IR and which upon replacing the receiver (case c) supplies to the respective row of cores a current of suitable value which is for example 2–3 times greater than the writing current and has opposite direction relatively to the latter. In this manner the cores being in 1 condition will be switched.

At the same time as the selecting chain AK the first time is called by FIR the latter calls also REG-Y, in consequence of which a half magnetizing current is sent from REG-Y to the vertical magnetizing wires in correspondence to the numbers of the subscribers, so that the cores intended can be switched to 1 condition. Upon the second call from FIR the chain AK calls also a clock device KL which supplies a half magnetizing current to said 22 wires in order to switch the cores corresponding to the time at the same time as a half current is supplied to the horizontal wire. The clock device can be of arbitrary type, for example the type described in Bell Monograph 1752, pages 6–7. At the same time as the chain AK is called and the records in the accounting memory are read out, the chain AK again calls the clock device in order to define the time of the conversation end. This is carried out in such a manner that to the 22 wires again a magnetizing current is supplied and is fed to a subtracting device SU as will be explained later.

According to the embodiment 2×3=6 calling wires are necessary from each FIR to the calling chain AK in order to cause a call on said three occasions. Furthermore there is a seventh wire in order to signal after each of said three calls from AK to FIR that the call has been completed and AK can be released.

When the call is finished and the records in the respective row in the accounting memory are read out, the signals are fed through the 125 read out wires to a treating memory BM consisting of a corresponding number of memory units. These can consist of ferrite cores or relays in a manner known per se. From the treating memory the information concerning the time of the beginning is fed to a subtracting device SU which also obtains the time from the clock device KL as mentioned before. By a subtraction thus the length of the conversation will be obtained. The subtracting device can be of known type, for example the type described in Bell Laboratory Records, 1946, page 457. On the other hand signals corresponding to the numbers of the subscribers are supplied from the treating memory to a tariff device TA which on the basis of said two numbers accounts the tariff which has to be used. Such a tariff device can be of the type described in Bell Laboratory Records, 1958, pages 374–375 and is titled "Billing Indexer." The information from the treating memory BM, from the subtracting device SU and the tariff device TA is supplied to a buffer memory BU where it is kept until a writing out device or a perforating device PU will be idle. The buffer memory as well as the perforating device are known before and do not form object of the invention.

As appears from the above the fundamental principle of the invention consists therein that the information necessary for the accounting is stored during the whole conversation on a recording medium belonging to the connection. Said recording medium is read out and released after the end of the conversation, after which the records are immediately treated and written out. The manner in which the result is written out and in which the accounting particulars are noted on the ticket belonging to the respective conversation has no importance from the point of view of the invention.

We claim:

An accounting device for automatic telephone exchanges which comprise a number of connecting relay sets each for connecting a calling subscriber with a called subscriber, said accounting device including a register connected to said connecting relay set during at least part of the duration of the call and recording the numbers of the calling and called subscribers, an accounting memory unit having a plurality of memory elements arranged in rows and columns and having row conductors and column conductors, each row corresponding to a definite connecting relay set, first current supplying means for supplying to an arbitrary row conductor a current which together with a current through a column conductor associated to a memory element brings said memory element from one condition to another condition and second current supplying means supplying to said row conductors a current sufficient to switch said memory elements from said other condition to said one condition so as to obtain a signal on column conductors associated with the memory elements switched, a selecting circuit for selecting one of said rows and for connecting the same to said first or said second current supplying means, means in said register for supplying a current to a first plurality of column conductors representing the calling and the called subscriber number in code form, a clock device for supplying a current to a second plurality of column conductors representing time in code form, first means in said connecting relay set operated upon the recording of said calling and called subscriber number in said register for operating said selecting circuit to connect said first current supplying means to the row conductor associated with the respective connecting relay set, the memory elements which have their column conductors energized by the register being brought from said one condition to said other condition, second means in said connecting relay set operated upon the answer of the called subscriber for operating said selecting circuit to connect said first current supplying means to the row conductor associated with the respective connecting relay set and for connecting said clock device to said second plurality of conductors, the memory elements which have their column conductors energized being brought from said one condition to said other condition, and third means in the connecting relay set operated upon terminating the conversation for operating said selecting circuit to connect said second current supplying means to the row conductor associated with the respective connecting relay set so as to produce on the column conductors associated with the switched memory elements signal information concerning the calling and the called subscriber number and the beginning time of the conversation, a treating memory unit having memory elements each corresponding to a column conductor for recording said signal information obtained from said column conductors, clock switching means operated upon operation of said second current supplying means and connecting said clock unit to a third plurality of conductors representing the time in code, a subtracting device supplied with the beginning time information from said treating memory unit and the terminating time information from said clock unit to define the duration of the conversation, a tariff device defining on the basis of the calling and called number the cost of the conversation per time unit, and means for recording charging tickets stating the number of at least the calling subscriber, the cost per time unit, and the length of the conversation time.

References Cited by the Examiner

UNITED STATES PATENTS 3,164,677   1/1965   Morris et al. _____ 179—7.1

ROBERT C. BAILEY, *Primary Examiner.*

P. L. BERGER, *Assistant Examiner.*